United States Patent
Saito

(10) Patent No.: US 8,289,402 B2
(45) Date of Patent: Oct. 16, 2012

(54) IMAGE PROCESSING APPARATUS, IMAGE PICKUP APPARATUS AND IMAGE PROCESSING METHOD INCLUDING IMAGE STABILIZATION

(75) Inventor: Mitsuhiro Saito, Yokohama (JP)

(73) Assignee: Canon Kabushiki Kaisha (JP)

( * ) Notice: Subject to any disclaimer, the term of this patent is extended or adjusted under 35 U.S.C. 154(b) by 352 days.

(21) Appl. No.: 12/616,584

(22) Filed: Nov. 11, 2009

(65) Prior Publication Data

US 2010/0118156 A1    May 13, 2010

(30) Foreign Application Priority Data

Nov. 12, 2008   (JP) .................................. 2008-290243

(51) Int. Cl.
*H04N 5/228* (2006.01)
*H04N 7/18* (2006.01)
(52) U.S. Cl. .................. 348/208.4; 348/155; 348/208.1; 348/208.5
(58) Field of Classification Search .............. 348/208.1, 348/208.5, 208.14
See application file for complete search history.

(56) References Cited

U.S. PATENT DOCUMENTS

| 5,237,405 A * | 8/1993 | Egusa et al. | 348/208.1 |
| 5,712,474 A * | 1/1998 | Naneda | 250/208.1 |
| 7,969,470 B2 * | 6/2011 | Kishida | 348/208.14 |
| 8,120,661 B2 * | 2/2012 | Rabinowitz et al. | 348/208.6 |
| 8,159,543 B2 * | 4/2012 | Drouot | 348/208.4 |
| 2005/0163348 A1 * | 7/2005 | Chen | 382/107 |
| 2005/0231602 A1 * | 10/2005 | Obrador et al. | 348/208.14 |

FOREIGN PATENT DOCUMENTS

JP   4-180370 A   6/1992

* cited by examiner

*Primary Examiner* — Ngoc-Yen Vu
(74) *Attorney, Agent, or Firm* — Rossi, Kimms & McDowell LLP

(57) ABSTRACT

The image processing apparatus includes an extracting part extracting feature points in each of plural images sequentially generated by an image pickup apparatus, a calculating part calculating motion vectors at the feature points in each of the plural images, a clustering part performing clustering processing on the motion vectors calculated at the feature points, a determining part determining, among plural clusters, a specific cluster including a motion vector indicating motion of the image pickup apparatus. The apparatus further includes an estimation detecting part detecting, by using an estimation method which uses information relating to the specific cluster of a first image, the specific cluster of a second image generated after generation of the first image, and a processing part performing image stabilization processing on the second image based on the motion vector included in the specific cluster of the second image.

6 Claims, 11 Drawing Sheets

IMAGE PROCESSING APPARATUS, IMAGE PICKUP APPARATUS AND IMAGE PROCESSING METHOD INCLUDING IMAGE STABILIZATION

BACKGROUND OF THE INVENTION

The present invention relates to an image processing technology for reducing image shaking caused by shaking or motion of an image pickup apparatus.

As an image stabilization method for reducing image shaking accompanying shaking and motion (hereinafter, collectively referred to as "motion") of the image pickup apparatus, there is electronic image stabilization which uses an image processing technology. The electronic image stabilization includes one that performs image stabilization processing which calculates motion vectors for frame images sequentially generated by the image pickup apparatus, and then shifts or deforms an actually outputting area (clipping area) of each frame image based on the motion vectors.

In such electronic image stabilization that uses the motion vectors, however, if a moving object such as a pedestrian or a vehicle is present within an image pickup area, not only a motion vector by motion of the image pickup apparatus but also a motion vector by motion of the moving object are calculated. Then, if the image stabilization processing is carried out based on the motion vector of the moving object, image shaking accompanying the motion of the image pickup apparatus cannot be sufficiently reduced.

Thus, in an electronic image stabilization method disclosed in Japanese Patent Laid-Open No. 4-180370, plural detection areas is provided in each frame image, and a motion vector is calculated for each detection area. Then, the detection areas having small differences in direction and size of the detected motion vectors are collected into one group (cluster), which is referred to as "clustering processing". In this way, a cluster of the motion vectors by the image pickup apparatus and a cluster of the motion vectors by the moving object are separated from each other.

Then, image stabilization processing is performed based on the motion vectors included in the cluster of the motion vectors by the motion of the image pickup apparatus.

In the electronic image stabilization method disclosed in Japanese Patent Laid-Open No. 4-180370, a cluster present before the moving object enters the image pickup area is selected as a cluster of motion vectors by the motion of the image pickup apparatus (hereinafter, referred to as an image stabilization target cluster meaning a cluster including image stabilization target motion vectors).

According to such an electronic image stabilization method, when an amount of motion of the image pickup apparatus is small due to, for example, hand jiggling, fluctuation is limited in positions of the image stabilization target clusters in the sequentially generated frame images. As a result, good image stabilization processing can be continued without losing the image stabilization target cluster.

However, when the amount of the motion of the image pickup apparatus is large or when a large camera motion such as panning or tilting is intentionally provided to the image pickup apparatus, great fluctuation occurs in positions of the image stabilization target clusters of the sequentially generated frame images. Thus, it is highly likely that the image stabilization target clusters are lost to cause a difficulty of continuing good image stabilization processing.

SUMMARY OF THE INVENTION

The present invention provides an image processing apparatus that can continue good image stabilization processing without losing the stabilization target cluster while employing the clustering processing of the motion vectors which is capable of removing the influence of the moving object in the image, an image pickup apparatus including such an image processing apparatus, and an image processing method.

The present invention provides as one aspect thereof an image processing apparatus including an extracting part configured to extract feature points in each of plural images sequentially generated by an image pickup apparatus, a calculating part configured to calculate motion vectors at the feature points in each of the plural images, a clustering part configured to perform clustering processing on the motion vectors calculated at the feature points, a determining part configured to determine, among plural clusters obtained by the clustering processing, a specific cluster including a motion vector indicating motion of the image pickup apparatus, an estimation detecting part configured to detect, by using an estimation method which uses information relating to the specific cluster of a first image among the plural images, the specific cluster of a second image generated after generation of the first image, and a processing part configured to perform image stabilization processing on the second image based on the motion vector included in the specific cluster of the second image.

The present invention provides as another aspect thereof an image pickup apparatus including an image pickup part configured to perform image pickup of an object to sequentially generate plural images, and the above-described image processing apparatus.

The present invention provides as still another aspect thereof an image processing method comprising the steps of extracting feature points in each of plural images sequentially generated by an image pickup apparatus, calculating motion vectors at the feature points in each of the plural images, performing clustering processing on the motion vectors calculated at the feature points, determining, among plural clusters obtained by the clustering processing, a specific cluster including a motion vector indicating motion of the image pickup apparatus, detecting, by using an estimation method which uses information relating to the specific cluster of a first image among the plural images, the specific cluster of a second image generated after generation of the first image, and performing image stabilization processing on the second image based on the motion vector included in the specific cluster of the second image.

Other aspects of the present invention will become apparent from the following description and the attached drawings.

DESCRIPTION OF THE EMBODIMENTS

Exemplary embodiments of the present invention will hereinafter be described with reference to the accompanying drawings.

[Embodiment 1]

Figure 1:
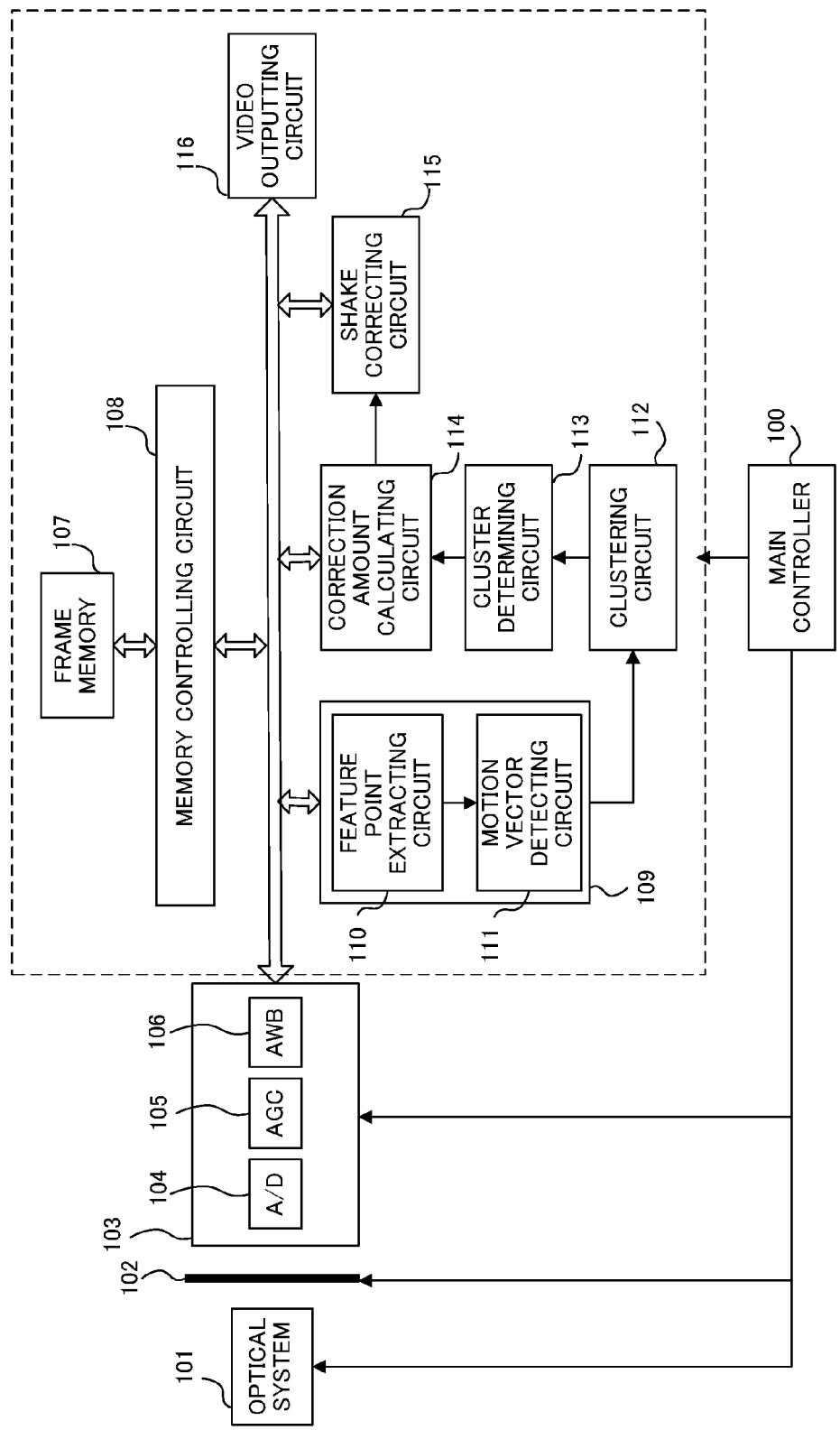
FIG. 1 shows a configuration of an image pickup apparatus which is a first embodiment (Embodiment 1) of the present invention.

FIG. 1 shows a configuration of an image pickup apparatus such as a video camera or a digital still camera including an image processing apparatus which is Embodiment 1 of the present invention.

In FIG. 1, reference numeral 101 denotes an optical system which forms an object image, and reference numeral 102 denotes an image pickup element such as a CCD sensor or a CMOS sensor which photoelectrically converts the object image formed by the optical system 101.

Reference numeral 103 denotes an image forming circuit which generates a video signal from electrical signals output from the image pickup element 102. The video signal is formed by plural frame images sequentially generated at a predetermined cycle.

The image forming circuit 103 includes an A/D converting circuit 104, an auto gain controlling circuit (AGC) 105 and an auto white balancing circuit (AWB) 106, which generates a digital video signal. The A/D converting circuit 104 converts an analog signal into a digital signal. The AGC 105 corrects a level of the digital signal. The AWB 106 corrects a white level of the video signal.

The optical system 101, the image pickup element 102 and the image forming circuit 103 constitute an image pickup system (image pickup part).

Reference numeral 107 denotes a frame memory which temporarily stores and holds one frame image or two or more frame images of the video signal generated by the image forming circuit 103. Reference numeral 108 denotes a memory controlling circuit which controls inputting/outputting of the frame images to the frame memory 107.

Reference numeral 109 denotes a motion vector calculating circuit. The motion vector calculating circuit 109 calculates motion vectors in each of the frame images sequentially generated (in other words, between one frame image and another frame image previously generated) by the image pickup system at each feature point described below.

The motion vector calculating circuit 109 includes a feature point extracting circuit (extracting part) 110 and a motion vector detecting circuit (calculating part) 111. The feature point extracting circuit 110 detects (extracts) plural feature points in each frame image, the feature points being points distinctive in the frame image. The motion vector detecting circuit 111 detects (calculates) the motion vectors at the feature points extracted by the feature point extracting circuit 110 in each frame image. The motion vector has a direction corresponding to a moving direction of the feature point and a size corresponding to a moving amount of the feature point.

Reference numeral 112 denotes a clustering circuit (clustering part) which performs clustering processing on the plural motion vectors obtained by the motion vector calculating circuit 109 at the plural feature points in each frame image. The "clustering processing" corresponds to grouping, i.e., collecting, among the plural motion vectors, two or more motion vectors having similar directions and equal sizes (e.g., directions and sizes whose differences are equal to predetermined values or lower) into one group. One motion vector may form one group. Hereinafter, one group will be referred to as "cluster".

Reference numeral 113 denotes a cluster determining circuit serving as a determining part. The cluster determining circuit 113 determines, among plural clusters obtained by the clustering circuit 112, a specific cluster including a motion vector indicating motion which is a shake reduction target (image stabilization target) described below. The specific cluster includes a motion vector indicating motion of the image pickup apparatus in this embodiment as described below, the motion vector in the specific cluster being obtained (calculated) at a feature point in a background region in the image pickup area.

The cluster determining circuit 113 detects a specific cluster of a second frame image (second image) generated after generation of a certain first frame image (first image) by using an estimation method which uses a specific cluster of the first frame image. In other words, the cluster determining circuit 113 also serves as an estimation detecting part. The estimation method will be described below. In the description below, the specific cluster will be referred to as "shake reduction target cluster" (image stabilization target cluster).

Reference numeral 114 denotes a reduction amount calculating circuit which calculates an image geometrical transformation amount as a shake reduction amount for the second frame image based on the motion vector included in the shake reduction target cluster detected in the second frame image by the cluster determining circuit 113 by using the estimation method.

Reference numeral 115 denotes a shake reducing circuit which performs image geometrical transformation processing (shake reduction processing or image stabilization processing) for shake reduction (image stabilization) based on the shake reduction amount calculated by the reduction amount calculating part 114. The reduction amount calculating circuit 114 and the shake reducing circuit 115 constitute a processing part.

The motion vector calculating circuit 109, the clustering circuit 112, the cluster determining circuit 113, the reduction amount calculating circuit 114 and the shake reducing circuit 115 constitute an image processing apparatus. In other words, the image pickup apparatus of Embodiment 1 includes the image pickup system described above and the image processing apparatus.

Reference numeral 116 denotes a video outputting circuit which constitutes an outputting part for displaying a shake-corrected video (frame image) on a display (not shown) or recording it in a recording medium such as a semiconductor memory, an optical disk or a magnetic tape.

Reference numeral 100 denotes a main controller which controls operations of the image pickup element 102, the image forming circuit 103, the motion vector calculating circuit 109, the clustering circuit 112, the cluster determining circuit 113, the reduction amount calculating circuit 114, the shake reducing circuit 115 and the video outputting circuit 116. The main controller 100 is constituted by a CPU or the like.

Referring to a flowchart of FIG. 2, an operation (image processing method) of the image pickup apparatus thus configured will be described. The operation described is executed according to a computer program stored in a memory (not shown) in the main controller 100. The same applies to embodiments described below.

Figure 2:
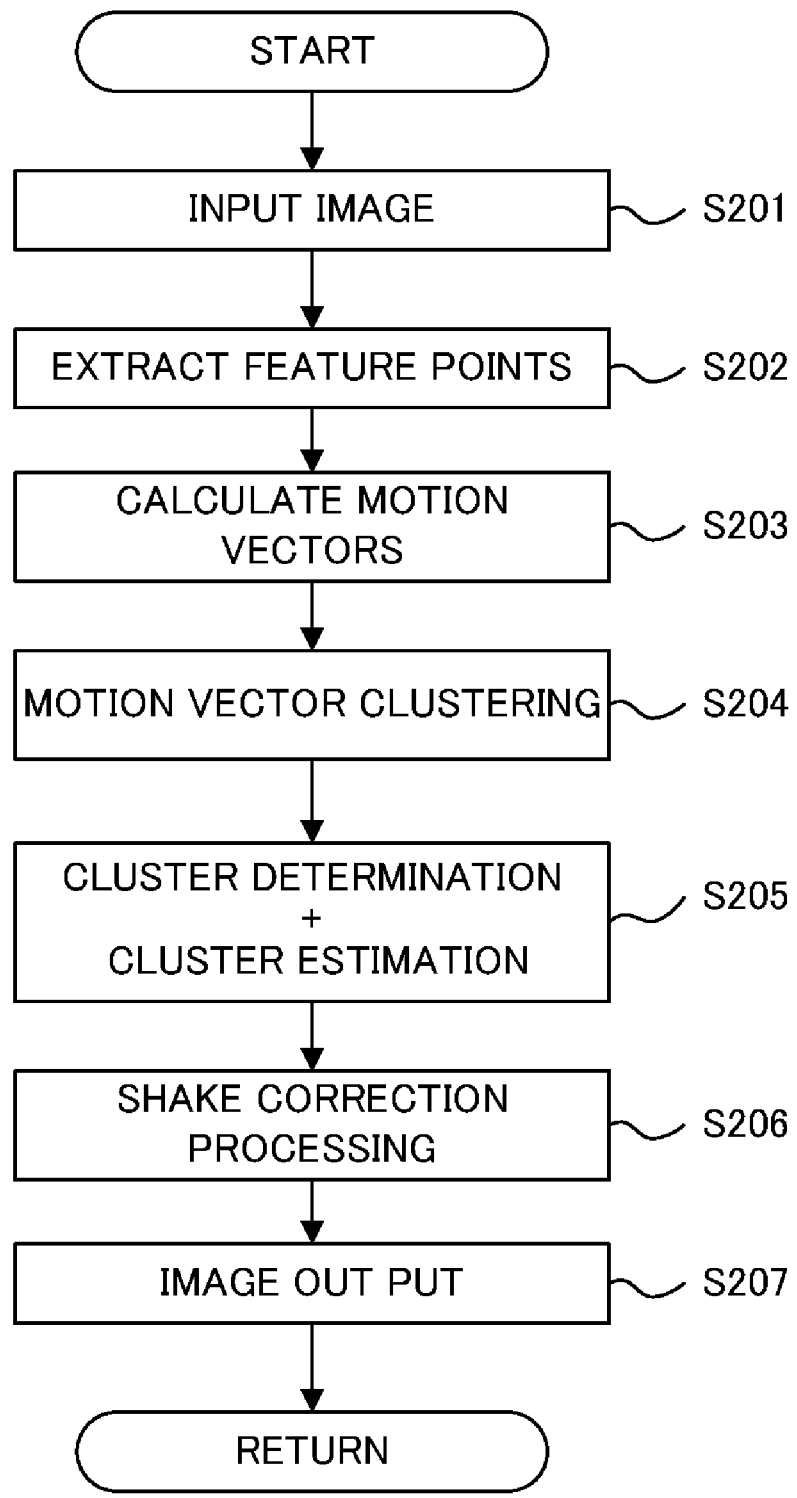
FIG. 2 is a flowchart of shake reduction processing in Embodiment 1.

In FIG. 2, at Step S201, the image pickup element 102 photoelectrically converts an object image formed by the optical system 101. The image pickup element 102 outputs an analog signal according to object luminance, and the analog signal is input to the image forming circuit 103. The image forming circuit 103 converts the analog signal into, for example, a 12-bit digital signal by the A/D converting circuit 104. Further, the digital video signal subjected to signal level correction and white level correction by the AGC 105 and the AWB 106 is recorded and stored in the frame memory 107.

In the image pickup apparatus of Embodiment 1, plural frame images are sequentially generated at the predetermined cycle (frame rate), and the plural frame images recorded and stored in the frame memory 107 are sequentially input to the motion vector calculating circuit 109. The frame images stored in the frame memory 107 are sequentially updated. The above operation is controlled by the memory controlling circuit 108. In Embodiment 1, the frame images constituting a moving image (video) are described. However, a field image constituting a frame image may be used as one "image".

At Step S202, the feature point extracting circuit 110 extracts feature points present in each frame image. Detection of a motion vector is generally performed by calculation based on a correlation of texture information in a region including an attention pixel and its vicinity between continuous frame images. Thus, when there is no texture in the region including the attention pixel and its vicinity and almost no change in luminance value, a corresponding relationship (correlation) cannot be found between the frame images.

Thus, extracting edges and line segment end points of an object as the feature points in advance and setting these feature points as the attention pixels in motion vector detection enables accurate motion vector detection (calculation). Methods for extracting the feature points include a method setting intersection points of edges of an image as the feature points, a method using color information and the like, and any one of these methods may be used.

At Step S203, the motion vector detecting circuit 111 detects (calculates) the motion vector of each frame image by using the frame image and a frame image generated before that frame image. For the motion vector detection, any one of general detection methods such as a template matching method and a gradient method may be used.

At Step S204, the clustering circuit 112 performs clustering processing on the motion vectors obtained at the feature points by the motion vector calculating circuit 109.

The clustering processing in Embodiment 1 will hereinafter be described. In Embodiment 1, the clustering processing is performed by focusing on the sizes of the motion vectors.

Figure 3:
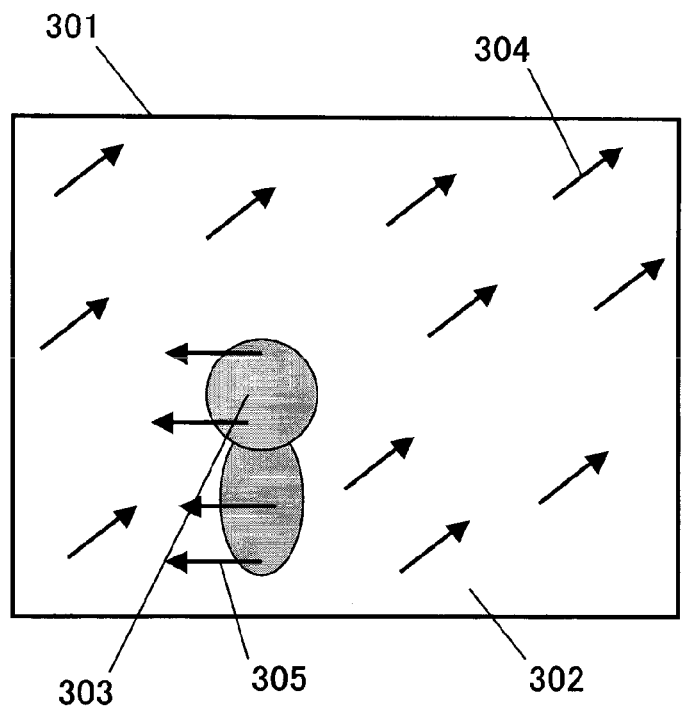
FIG. 3 shows motion vector calculation processing when a moving object is present in an image.

FIG. 3 shows a calculation example of the motion vectors. It is presumed that, in a state where there are a background region 302 as a still object and a moving object 303 moving left in a frame image 301 (that is, in the image pickup area of the image pickup apparatus), motion of the image pickup apparatus occurs in a right upward direction. The motion of the image pickup apparatus includes not only small motion of the image pickup apparatus caused by hand jiggling or the like but also larger motion and intentional motion caused by camera motion such as panning or tilting.

In this state, the motion vector calculating circuit 109 extracts feature points present in the frame image 301, and then calculates the motion vectors at the feature points. Reference numeral 304 denotes motion vectors at feature points on the background region 302. Reference numeral 305 denotes motion vectors of feature points on the moving object 303.

While the motion vectors 304 on the background region 302 reflect the motion of the image pickup apparatus, the motion vectors 305 on the moving object 303 has a direction and a size completely different from those of the motion vectors 304 on the background region 302.

Figure 4:
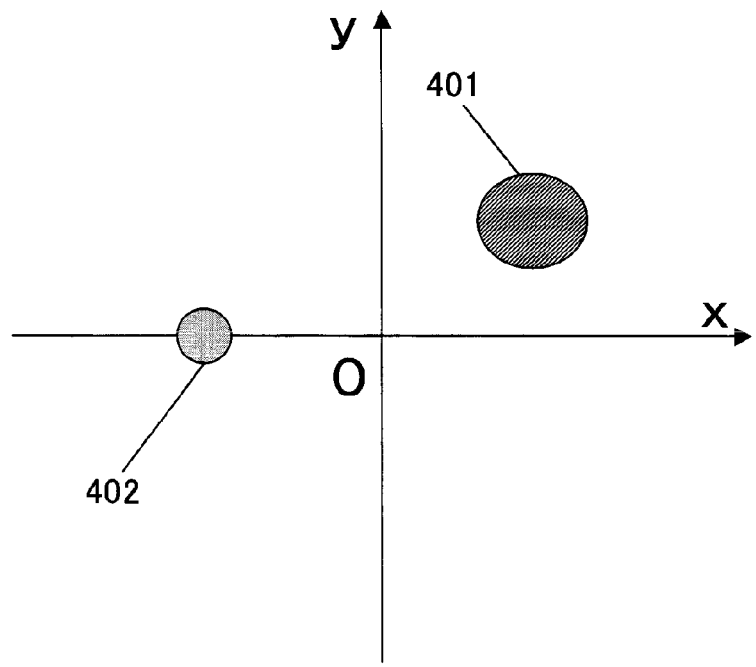
FIG. 4 shows clustering processing when the moving object is present.

FIG. 4 is a graph (cluster map) plotting the motion vectors 304 and 305 shown in FIG. 3 according to the sizes thereof. In FIG. 4, a horizontal axis indicates the size of the motion vector in an x direction (horizontal direction), and a vertical axis indicates the size of the motion vector in a y direction (vertical direction). A positive sign and a negative sign in the x direction denote that the direction of the motion vector is rightward and leftward, respectively. A positive sign and a negative sign in the y direction denote that the direction of the motion vector is upward and downward, respectively.

When the motion vectors whose sizes are focused on are plotted, two or more motion vectors having similar directions and sizes are plotted at similar positions. Such two or more motion vectors form a group, in other words, a cluster.

In FIG. 4, a cluster 401 is a cluster (hereinafter, also referred to as "background cluster") formed by the motion vectors 304 on the background region. A cluster 402 is a cluster (hereinafter, also referred to as "moving object cluster") formed by the motion vectors 305 on the moving object.

Thus, performing the clustering processing on the motion vectors enables separation of the motion vectors on the background region, i.e., the motion vectors of the still object, which correspond to the motion of the image pickup apparatus, and the motion vectors corresponding to the moving object from each other.

The above clustering processing is performed sequentially on the plural motion vectors calculated for the sequentially generated frame images.

In the description below, the frame image may simply be referred to as "frame".

This embodiment describes the case where the clustering processing is performed by focusing on the sizes of the motion vectors. However, other clustering methods such as a method for performing the clustering processing by using spatial differential values of the motion vectors may be used.

At Step S205, the cluster determining circuit 113 determines, among the background and moving object clusters 401 and 402 obtained for an initial frame image (hereinafter, also referred to as "initial frame"), the background frame 401 as the shake reduction target cluster. This determination method will be described below.

The cluster determining circuit 113 detects the shake reduction target cluster among plural clusters obtained in frames after the initial frame by using an estimation method described below.

The estimation method for estimating the shake reduction target cluster in Embodiment 1 will hereinafter be described. The estimation method accumulates position information of the background cluster 401 obtained on the cluster map as a result of the clustering processing (FIG. 4) on each frame (that is, after each time of the clustering processing). Thus, movement track information of the background cluster 401 can be obtained. The position information and the movement track information of the background cluster 401 are both "information relating to the cluster".

Specifically, a barycentric position of the background cluster 401 is set as a position of the background cluster 401, and a track drawn by accumulating the position for each frame is set as the movement track of the background cluster 401. The movement track of the background cluster 401 corresponds to a motion track (changes in direction and size of motion) of the image pickup apparatus.

Figure 5:
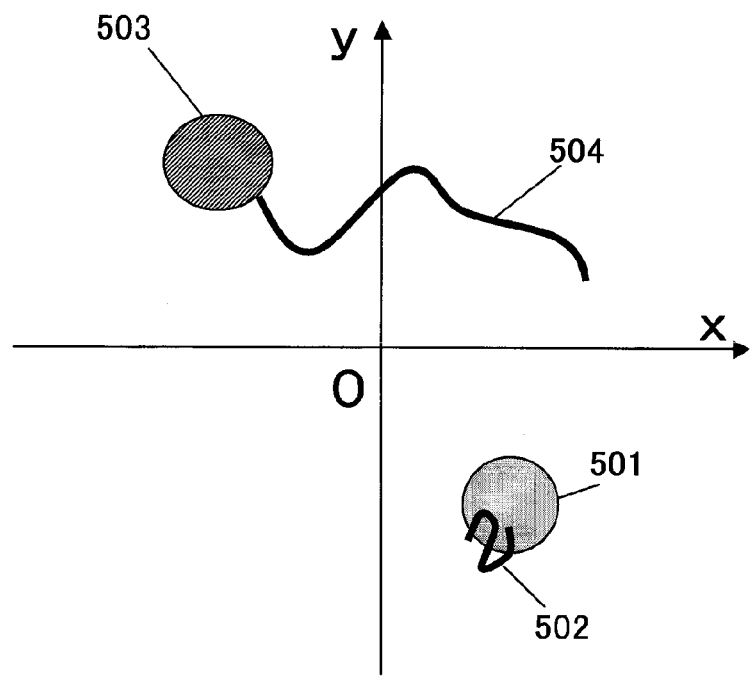
FIG. 5 shows a movement track of a cluster.

FIG. 5 shows an example of a movement track obtained by accumulating positional information of a cluster. In FIG. 5, when the image pickup apparatus has small motion such as hand jiggling, a movement track 502 of a background cluster 501 is drawn such that the background cluster 501 stays at substantially a same position. Thus, if the background cluster 501 is selected as the shake reduction target cluster at a stage of an initial frame, a cluster present at substantially the same position may be detected as the shake reduction target cluster in subsequent frames.

However, when the image pickup apparatus has large motion, a background cluster 503 is greatly moved as indicated by its movement track 504. Thus, if only the background cluster 503 is selected for the initial frame, it is extremely difficult to accurately detect a cluster corresponding to the background cluster 503 for the subsequent frames.

Thus, in Embodiment 1, as described above, the cluster determining circuit 113 detects, by using the estimation method using the position information of the shake reduction target cluster of the certain first frame, the shake reduction target cluster of the second frame generated after generation of the first frame. In other words, a position of a current shake reduction target cluster is estimated by using position information of a past shake reduction target cluster, and a cluster present in the estimated position or its periphery (vicinity) is detected as the shake reduction target cluster.

This enables highly accurate and high speed (highly efficient) detection of the shake reduction target cluster.

Figure 6:
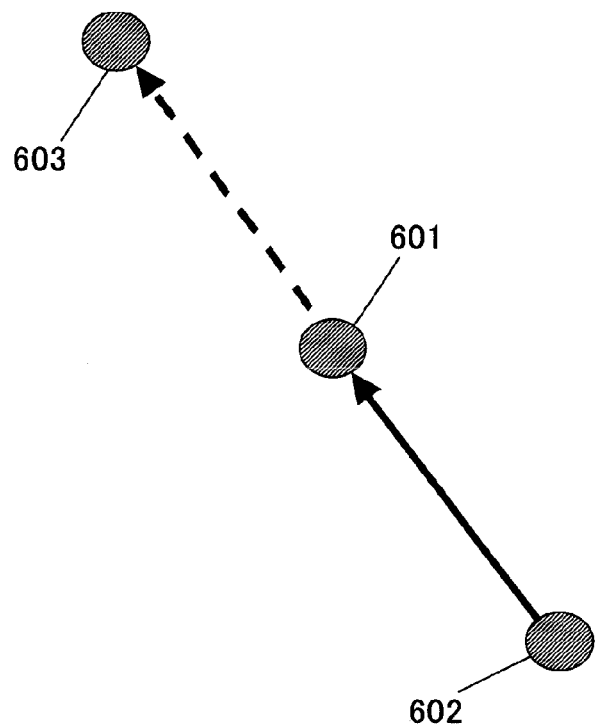
FIG. 6 shows estimation processing of a cluster position.

In this embodiment, the shake reduction target cluster is detected by using a linear estimation method. FIG. 6 shows an example of the movement track of the shake reduction target cluster. In FIG. 6, a coordinate position of a cluster 601 one frame before a current frame is set to C(t−1)=(x(t−1), y(t−1)). A coordinate position of a cluster 602 two frames before the current frame is set to C(t−2)=(x(t−2), y(t−2)).

When the position of the cluster linearly changes, a predicted position C(t)=(x(t), y(t)) of a cluster 603 in the current frame can be represented by the following expression (1):

$$C(t) = C(t-1) + (C(t-1) - C(t-2))$$
$$= 2C(t-1) - C(t-2) \quad (1)$$

It is highly likely that the cluster 603 of the current frame is present at the predicted position C(t) or its vicinity. Thus, searching for only a surrounding region of the predicted position C(t) enables detection of the shake reduction target cluster 603 in the current frame.

In place of such a linear estimation method, other estimation methods such as that using Kalman filter may be used. Further, when an estimation method is used which searches for the shake reduction target cluster in the current frame within a predetermined distance around a position of a cluster in a frame before the current frame (hereinafter, also referred to as "previous frame") is used, the shake reduction target cluster can be efficiently detected.

Further, the estimation method for estimating the shake reduction target cluster can use information relating to the cluster other than the position information of the shake reduction target cluster.

For example, even when the motion of the image pickup apparatus is large, almost no change may occur in number or distribution of the feature points in the background region between two continuous frame images. Therefore, in the result of the clustering processing, between the two continuous frame images, the numbers and distributions of the motion vectors included in the background clusters (that is, shapes of the background clusters) may be regarded as substantially equal to each other.

Thus, a cluster having at least one of the number of the motion vectors and a shape approximately equal to those of the shake reduction target cluster in the previous frame can be estimated as the shake reduction target cluster in the current frame.

When performing the estimation based on the number of the motion vectors included in the cluster, as its estimation method (estimation reference), for example, the following method can be employed. First, a difference in numbers of the included motion vectors between the cluster of the previous frame and the cluster of the current frame is calculated. Then, if the difference in number of the included motion vectors is within a fixed ratio (e.g., 10%) of the number of the motion vectors included in the previous frame, the cluster of the current frame can be estimated as a cluster corresponding to the cluster of the previous frame.

When performing the estimation based on a cluster shape, as its estimation method, for example, the following method can be employed. First, sizes of the cluster of the previous frame and the cluster of the current frame are detected as spreads of the clusters in vertical and horizontal directions, and a difference in spread is calculated. Then, if the difference in spread is within a fixed ratio (e.g., 10%) of the spread of the cluster of the previous frame, the cluster of the current frame can be estimated as a cluster corresponding to the cluster of the previous frame.

As described above, the use of the estimation method using the information relating to the shake reduction target cluster in the past frame (previous frame) enables, even when the motion of the image pickup apparatus is large, highly accurate and highly efficient detection of the shake reduction target cluster in the current frame. Employing this method enables, even when the shake reduction target cluster and the moving object cluster overlap each other and are subsequently separated again, accurate identification of which is the shake reduction target cluster.

The information relating to the cluster such as the cluster position information, the information on the number of the motion vectors included in the cluster and the cluster shape information may be used independently. However, the shake reduction target cluster in the current frame may be estimated by using two or more of the cluster position information, the information on the number of the motion vectors included in the cluster and the cluster shape information. This enables highly accurate and highly efficient detection of the shake reduction target cluster.

Next, a method for determining the background cluster (shake reduction target cluster) in the initial frame will be described. When there is the moving object 303 in the frame image 301 as shown in FIG. 3, the plural clusters 401 and 402 are obtained as shown in FIG. 4. Therefore, it is necessary to determine which one of the clusters 401 and 402 in the initial frame is the background cluster.

Motion of the background region reflects the motion of the image pickup apparatus. Generally, an occupying ratio of the background region in the frame image is frequently larger than that of the moving object.

The number of the motion vectors calculated in the background region is accordingly larger than those of the motion vectors calculated in other regions. Thus, the cluster including the motion vectors in the background region includes a greater number of the motion vectors than those including the motion vectors in the other areas. In Embodiment 1, among the plural clusters, a cluster including the greatest number of the motion vectors is determined as the background cluster, in other words, the shake reduction target cluster.

As an example of detecting the cluster including the greatest number of the motion vectors, a coarse-to-fine search method will be described. This method first divides an image into four regions, i.e., upper, lower, left and right regions, and selects one region including the greatest number of the motion vectors (plot points) among the four regions. The method further divides the selected region into four small regions, and selects one small region including the greatest number of the plot points among the four small regions.

Thus, repeating the region division and the selection of the region including the greatest number of the plot points enables narrowing down of a region where the plot points of the motion vectors gather most densely, in other words, a position of the cluster including the greatest number of the motion vectors.

Further, in order to detect how much the cluster including the greatest number of the motion vectors spreads, a region in the vicinity of the plot points in the narrowed-down position is searched for, and whether another plot points is present in that region is checked. If the other plot point is found, that plot point is determined to belong to the same cluster.

Similarly, whether further another plot point is present in the vicinity of the newly found plot point is checked. After repeating searching for the plot points, when no other plot point is found in any neighboring region of each plot point in the cluster, the cluster has a spread corresponding to a region where the plot points are present.

As the method for detecting the cluster including the greatest number of the motion vectors and the spread of the cluster, methods other than the coarse-to-fine search method may be used. For example, a method for separating a cluster by a k-means method can be used.

The above estimation method enables good detection of the shake reduction target cluster in the current frame. Based on the motion vectors including in the detected shake reduction target cluster, good shake reduction processing can be performed for the current frame.

In FIG. 2, at Step S206, the reduction amount calculating circuit 114 and the shake reduction circuit 115 perform the shake reduction processing by using the motion vectors included in the shake reduction target cluster detected at Step S205. The shake reduction processing is this embodiment uses a homography (planar perspective transformation) model to calculate the image geometrical transformation amount as the shake reduction amount.

The reduction amount calculating circuit 114 calculates, based on the motion vectors included in the shake reduction target cluster detected in the frame images (hereinafter, referred to as "subsequent frame images") after the initial frame at Step S205, the image geometrical transformation amount between the subsequent frame images.

Assuming that a certain point a represented by the following expression (2) in a frame image moves to a point a' represented by the following expression (3) in a next frame image, $$a=[x,y,1]^T \quad (2)$$

$$a'=[x',y',1]^T \quad (3)$$

a correspondence relationship between the points a and a' can be represented by the following expression (4) using a homography matrix H:

$$a'=Ha$$

The homography matrix H is a determinant indicating change amounts of translation, rotation, magnification variation, shearing and tilting, and can be represented by the following expression (5):

$$H = \begin{bmatrix} h_{11} & h_{12} & h_{13} \\ h_{21} & h_{22} & h_{23} \\ h_{31} & h_{32} & 1 \end{bmatrix} \quad (5)$$

The points a and a' and the homography matrix H are represented by using homogeneous coordinates. The same applies in the description below.

Each element of the homography matrix H can be calculated by using the plural motion vectors included in the shake reduction target cluster estimated at Step S205, in other words, by using a correspondence relationship of between the feature points in the frame images and applying statistical processing such as least square processing. In this case, calculating each element of the homography matrix H after removing a cluster indicating motion of the moving object enables acquisition of a good image geometrical transformation amount of the entire frame image which is not affected by the presence of the moving object.

The homography matrix H thus obtained indicates an amount of image shaking. Hence, in order to correct the image shaking, the matrix needs to be converted so as to represent an image geometrical transformation amount which cancels the image shaking. In other words, an inverse matrix K of the homography matrix H in the following expression (6) is obtained:

$$a=Ka' \quad (6)$$

The use of the inverse matrix K enables returning of the feature point a' after the image shaking to a point whose coordinates are identical to those of the feature point a before the image shaking. In Embodiment 1, this inverse matrix K is referred to as "shake reduction amount".

The shake reducing circuit 115 performs shake reduction by performing image geometrical transformation processing for all the pixels in the frame image using the shake reduction amount K.

In Embodiment 1, the amount of the image shaking is represented by using the homography matrix H. However, other matrices such as a Helmart matrix and an affine transformation matrix may be used depending on types of image shaking.

Finally, at Step S207, the shake reducing circuit 115 outputs a shake-corrected image which is a frame image after the shake reduction processing to the video outputting circuit 116.

As described above, Embodiment 1 performs the clustering processing on the motion vectors calculated from the frame images, and detects the shake reduction target cluster of the current frame by using the estimation method which uses the information relating to the shake reduction target cluster of the past frame. Then, Embodiment 1 corrects the image shaking of the current frame by using the motion vectors included in the detected shake reduction target cluster.

Such image processing can continue, even when the motion of the image pickup apparatus is larger than that caused by hand jiggling or the like, good shake reduction processing (electronic image stabilization) without losing the shake reduction target cluster.

[Embodiment 2]

Figure 7:
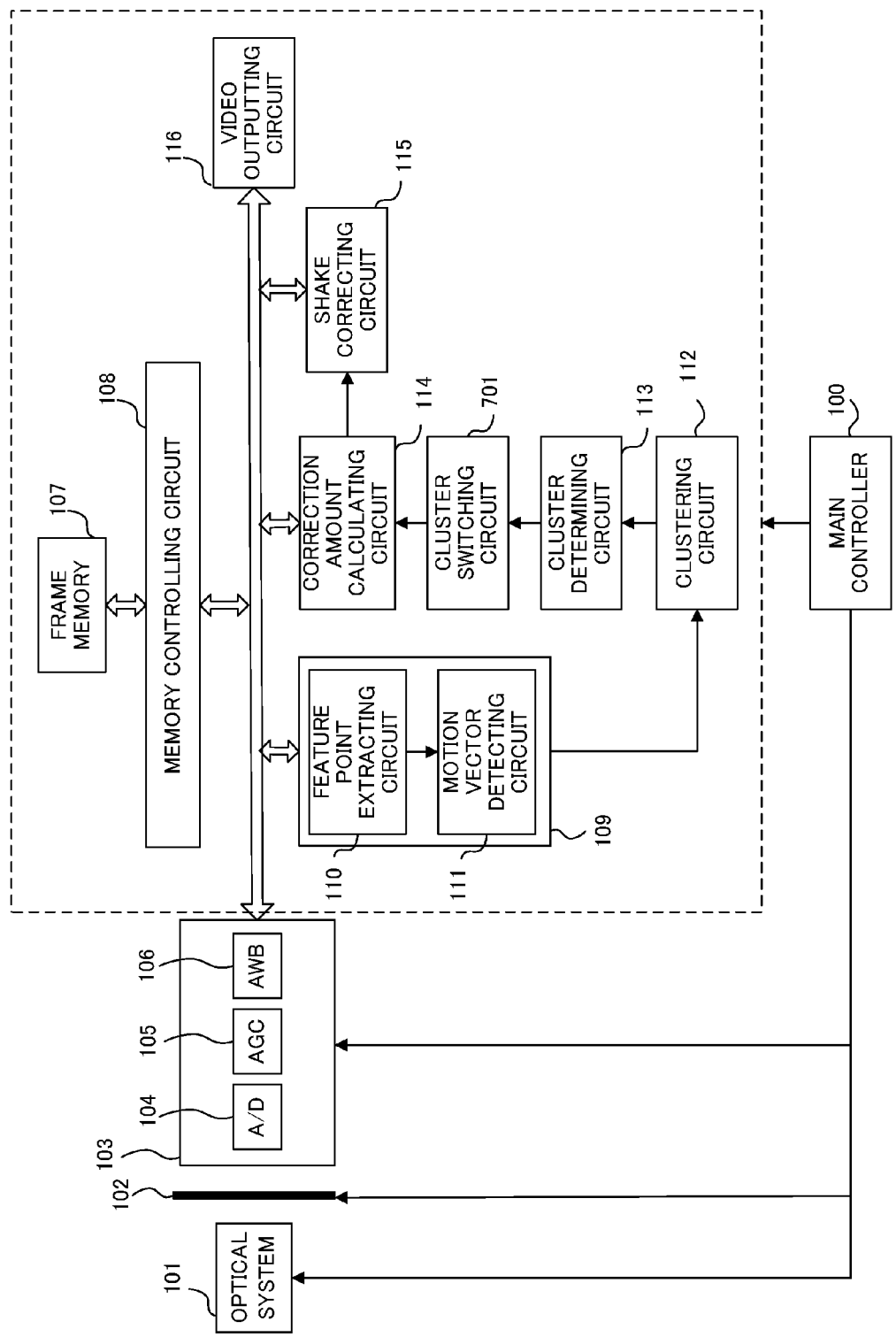
FIG. 7 shows a configuration of an image pickup apparatus which is a second embodiment (Embodiment 2) of the present invention.

FIG. 7 shows a configuration of an image pickup apparatus including an image processing apparatus which is Embodiment 2 of the present invention. Components common to those shown in FIG. 1 are denoted by the same reference numerals as those shown in FIG. 1.

Embodiment 2 appropriately switches, in plural clusters obtained by performing clustering processing, a shake reduction target cluster. The image pickup apparatus of this embodiment includes, in addition to the components shown in FIG. 1, a cluster switching circuit 701 which switches the shake reduction target cluster. The cluster switching circuit 701 constitutes a determining part together with a cluster determining circuit 113.

Referring to a flowchart of FIG. 8, an operation (image processing method) of the image pickup apparatus of Embodiment 2 will be described. Steps S801, S802, S803, S804 and S805 are respectively similar to Steps S201, S202, S203, S204 and S205 shown in FIG. 2.

At Step S805, as in the case of Step S205 of FIG. 2, the cluster determining circuit 113 determines, among plural clusters obtained by the clustering processing for an initial frame, a cluster including a greatest number of motion vectors to be the shake reduction target cluster. In this case, presuming that the greatest number of the motion vectors occupies a major part of a frame image, in other words, represents motion of a predominant object such as a background, the cluster determining circuit 113 determines the cluster including the greatest number of the motion vectors to be the shake reduction target cluster.

Then, estimating a shake reduction target cluster in a current frame using information relating to a shake reduction target cluster in a past frame enables, even when motion of the image pickup apparatus is large, continuous tracking of a cluster including motion vectors on a same object.

However, the continuous tracking of the cluster including the motion vectors on the same object may produce a condition where no good shake reduction result can be obtained.

Figure 9:
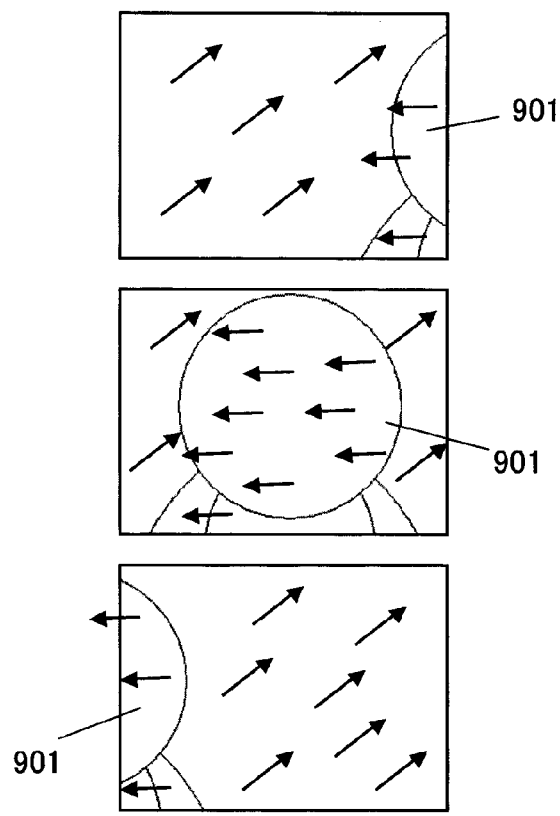
FIG. 9 shows motion vector calculation processing when a moving object passes in an image.
Figure 10:
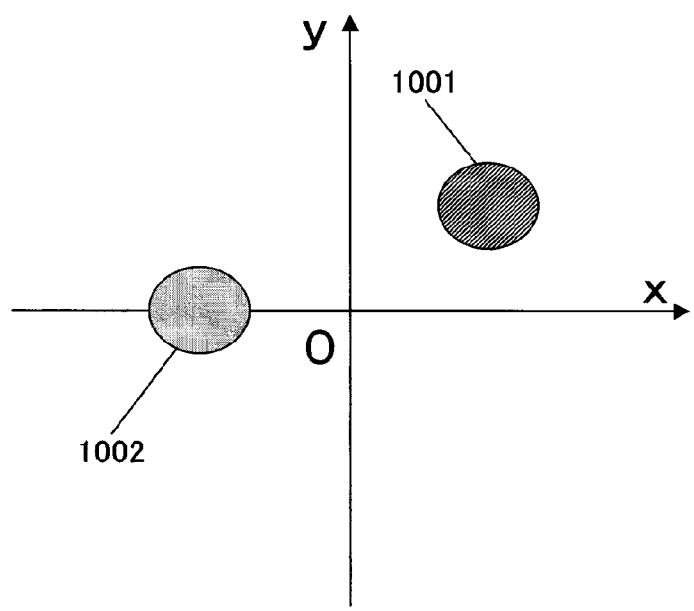
FIG. 10 shows clustering processing when the moving object passes in the image.

FIG. 9 shows an example of such a condition. FIG. 9 specifically shows a case where an object (hereinafter, referred to as "first object") 901 other than a background having a size occupying a major part enters a frame image (image pickup area). FIG. 10 shows a result of the clustering processing on motion vectors in the condition shown in FIG. 9.

As shown in an upper part of FIG. 9, when the first object 901 starts to enter from a right side of the frame image to its left side, a cluster is obtained at a position indicated by reference numeral 1002 in FIG. 10. Immediately after the first object 901 starts its entry, a region occupied by the first object 901 in the frame image is small, and the number of motion vectors included in the cluster 1002 corresponding to the first object 901 is also small. Thus, as the shake reduction target cluster, a background cluster 1001 is determined.

As shown in a middle part of FIG. 9, when the first object 901 enters up to a position occupying a major part of the frame image, the number of the motion vectors included in the cluster 1002 corresponding to the first object 901 becomes greater than that of motion vectors included in the background cluster 1001.

Further, as shown in a lower part of FIG. 9, when the first object 901 exits from the frame image, the cluster 1002 corresponding to the first object 901 accordingly disappears.

In such a condition where the first object other than the background passes through the frame image, continuously estimating the background cluster as the shake reduction target cluster enables, as described in Embodiment 1, good shake reduction processing with little influence of the first object.

However, when the first object 901 stays long at the position of the middle part of FIG. 9, maintaining the background cluster as the shake reduction target cluster prevents reduction of image shaking for the first object 901 which is a predominant object in the frame image. As a result, an unnatural shake-corrected image is obtained.

Thus, Embodiment 2 switches the shake reduction target cluster in a case where a cluster (another cluster) corresponding to the first object other than the background occupying the major part of the frame image stays in the frame image for over a predetermined number of frames (predetermined number of images) or for over a predetermined time period. In other words, Embodiment 2 switches the shake reduction target cluster from the background cluster to the cluster corresponding to the first object. Such switching of the shake reduction target cluster enables generation of a more natural shake-corrected image.

Methods for determining whether to switch the shake reduction target cluster include a method comparing the numbers of the motion vectors included in the clusters with each other in each frame. That is, in the result of the clustering processing performed for each frame, the number of the motion vectors included in the shake reduction target cluster is compared with that of the motion vectors included in another cluster.

In a case where another cluster (hereinafter referred to as "new cluster") including the motion vectors greater in number (greatest number) than those included in the shake reduction target cluster newly appears and is present for over the predetermined number of frames or for over the predetermined time period, the shake reduction target cluster is switched from the cluster used thus far to the new cluster.

The methods for determining whether to switch the shake reduction target cluster include further another method comparing areas occupied by respective objects in the frame image with each other. Specifically, to the cluster formed at Step S804 from the plural motion vectors calculated at the plural feature points in the frame image, information indicating which feature point each motion vector has been calculated at is added.

The addition of such information makes it possible to inform which region in the frame image each cluster includes the motion vectors in. Then, areas of the regions corresponding to the clusters are compared with each other. This embodiment uses a region division method as a method for calculating the area of the region corresponding to each cluster from position information of the feature point.

First, this embodiment determines ranges that can be regarded as being included in an identical region based on the feature point by using information on color of the image, brightness thereof, profile thereof and the like. Then, assuming that plural feature points corresponding to plural motion vectors included in a same cluster are present in a same region, this embodiment couples the above-described ranges including the respective feature points together. Thereby, the region where the motion vectors included in the same cluster in the frame image are calculated can be known, and the area of this region is obtained by a method for calculating the number of pixels therein or the like.

Comparing the areas of the plural regions thus obtained with each other enables knowing of what level of an area ratio is occupied in the frame image by which area.

Then, this embodiment determines that the region occupying the largest area of the frame image is a region where the predominant object is present therein. Further, in a case where a cluster including the motion vectors corresponding to the predominant object (hereinafter, referred to as "predominant cluster") is continuously present for over a predetermined number of frames (or a predetermined time period), this embodiment switches the shake reduction target cluster to the predominant cluster.

In other words, when a cluster including the motion vectors in a region occupying a larger area of the frame image than the shake reduction target cluster which has been determined is present for over the predetermined number of frames (or the predetermined time period), this embodiment switches the shake reduction target cluster to that cluster.

The method for determining the switching of the shake reduction target cluster is not limited to the above-described two methods, and other methods may be used. Moreover, plural switching methods may be used in combination.

The predetermined number of frames or the predetermined time period necessary for determining the switching of the shake reduction target cluster may be a fixed value or a variable value which a user can manually set in advance. The variable value may be set to a value which can be empirically obtained for a moving speed of an object entering the frame image.

For example, assuming that as an object a pedestrian passes through the frame image at 20 to 30 frames or an automobile passes therethrough at about 5 frames, when a cluster corresponding to that object is continuously present exceeding such a number of frames, the switching of the shake reduction target cluster may be performed.

Further, the predetermined number of frames or the predetermined time period may be set by methods other than the above-described method. For example, a moving speed of a region (object) where the motion vectors included in a switching target cluster are obtained is calculated, and then the number of frames (hereinafter, referred to as "estimated number of passed frames") or a time period (hereinafter, referred to as "estimated passed time period) for which the object passes through the frame image is estimated according to the calculated moving speed.

As a method for calculating the moving speed by using the motion vector, any one of methods may be used such as a method for setting a value (size) of the motion vector at the time of cluster generation as the moving speed, or a method for setting an average value of the motion vectors in a predetermined number of frames after the cluster generation as the moving speed.

If the switching target cluster is present in the frame image over the estimated number of passed frames or the estimated passed time period, it may be determined that the region (object) where the motion vectors included in the switching target cluster are calculated stays in the frame image, and the shake reduction target cluster may be switched to the switching target cluster.

As described above, this embodiment determines the cluster corresponding to the region of the predominant object in the frame image to switch the shake reduction target cluster to that cluster. This enables execution of shake reduction processing which considers even a case where an object occupying a large area of the frame image stays therein for a long time. As a result, a more natural shake-corrected image can be generated.

If the switching of the shake reduction target cluster is performed immediately after the above-mentioned switching determination condition is satisfied, discontinuity will occur in the shake-corrected image between the frame images before and after the switching.

Thus, a method for executing weighting and averaging processing on the shake reduction amount to gradually switch the shake reduction target cluster will be described.

First, in a predetermined number of frames or a predetermined time period after a generation time of a cluster (switching target cluster) to which the shake reduction target cluster will be switched, two shake reduction amounts which are a shake reduction amount K1 for a cluster before the switching (hereinafter referred to as "shake reduction amount K1 before the switching") and a shake reduction amount K2 for the switching target cluster (hereinafter referred to as "shake reduction amount K2 after the switching") are calculated.

Then, a shake reduction amount K3 gradually switching from the shake reduction amount K1 before the switching to the shake reduction amount K2 after the switching by a predetermined number of frames (in plural steps) is calculated by using the following expression (7):

$$K3 = \alpha(t)K1 + (1-\alpha(t))K2 \qquad (7)$$

In the expression (7), $\alpha(t)$ represents a weighting coefficient, and t represents a frame number. An initial value of the frame number t for a switching start frame is 1, and the value of the frame number t is gradually reduced to 0 when the frame number t reaches the predetermined number of frames. Thus, the shake reduction amount can be gradually changed from K1 to K2.

When the weighting coefficient $\alpha(t)$ becomes 0 and the shake reduction amount K3 completely switches to K2, calculation of K1 is finished. For subsequent frames, K2 may be directly used as the shake reduction amount.

As a method for setting the predetermined number of frames necessary for the switching, the number of frames (steps) may be set based on a difference in position between the cluster before the switching and the cluster to which the shake reduction target cluster will be switched.

A position of the cluster before the switching is defined as $v=(x_v, y_v)$, and that of the cluster to which the shake reduction target cluster will be switched is defined as $w=(x_w, y_w)$. If one step is set to, for example, 0.1 focusing on an x coordinate of each cluster, the predetermined number of frames is calculated by the following expression (8):

$$\text{frame} = \frac{|x_v - x_w|}{0.1} \qquad (8)$$

The predetermined number of frames may be calculated by focusing on a y coordinate of each cluster. The number of steps may be set to any value as long as the number of frames calculated by the above expression is not less than 1. However, discontinuity of the shake-corrected image becomes more noticeable as the value becomes closer to 1. The weighting coefficient $\alpha(t)$ may be changed in any manner, linearly or nonlinearly, as long as its change is 1 to 0 in the number of frames calculated by the above expression.

A case where a region representing motion of the shake reduction target rapidly exits from the frame image at a speed of about several frames, in other words, the shake reduction target cluster rapidly disappears, will be considered. In such a case, if the switching is performed based on the number of frames calculated by the above method, before completion of the switching, the shake reduction processing is performed on a region not present anymore in the frame image, which generates an unnatural shake-corrected image.

Thus, in the case where the shake reduction target cluster disappears at the speed of about several frames, the number of frames necessary for the switching is reduced to, for example, 5 frames. As a result, a natural shake-corrected image can be generated without generating any image discontinuity when the shake reduction target cluster is switched.

Figure 8:
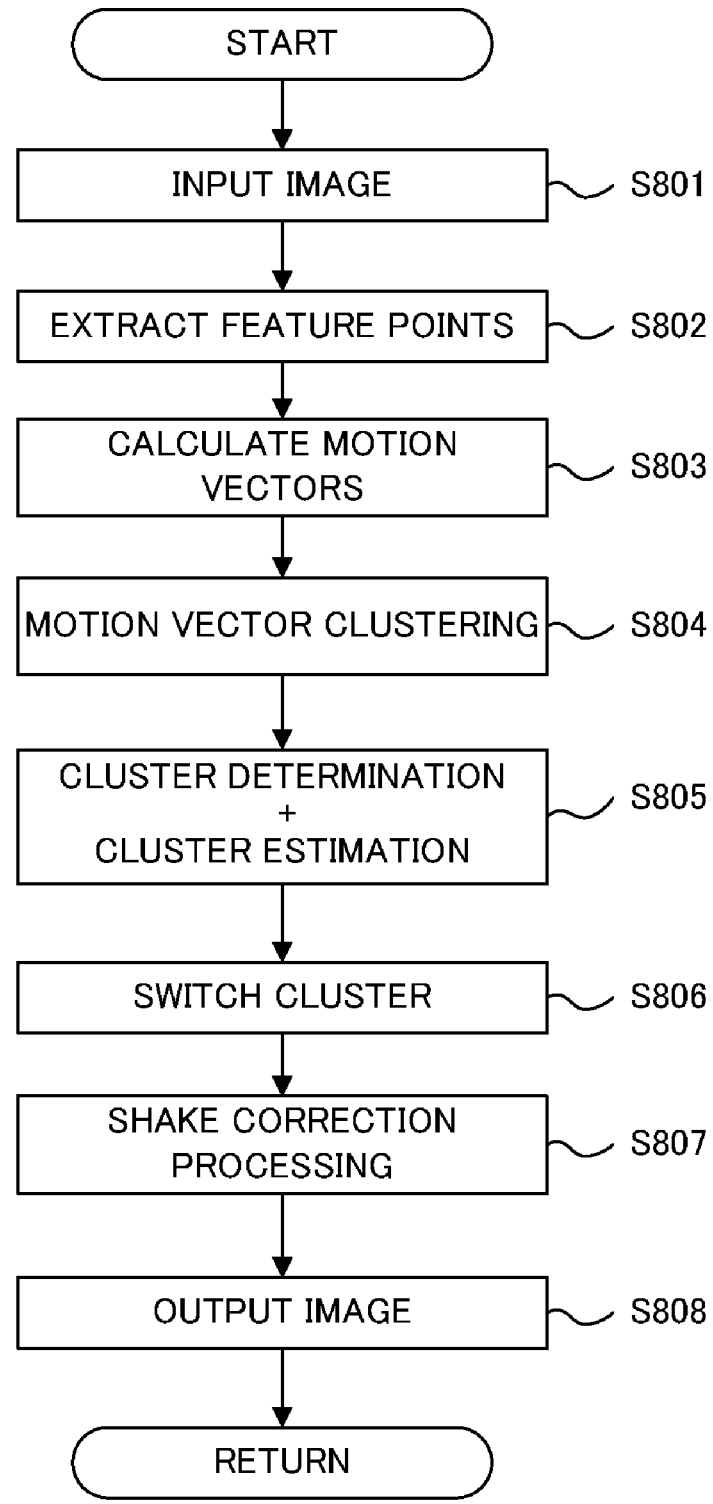
FIG. 8 is a flowchart of shake reduction processing in Embodiment 2.

In FIG. 8, Steps S807 and S808 are respectively similar to Steps S206 and S207 shown in FIG. 2.

As described above, Embodiment 2 determines the cluster corresponding to the predominant object (predominant region) in the frame image and switches the shake reduction target cluster to that cluster. This makes it possible to always perform the shake reduction processing on a region including a main object in the frame image, which enables generation of a better shake-corrected image.

[Embodiment 3]

Figure 11:
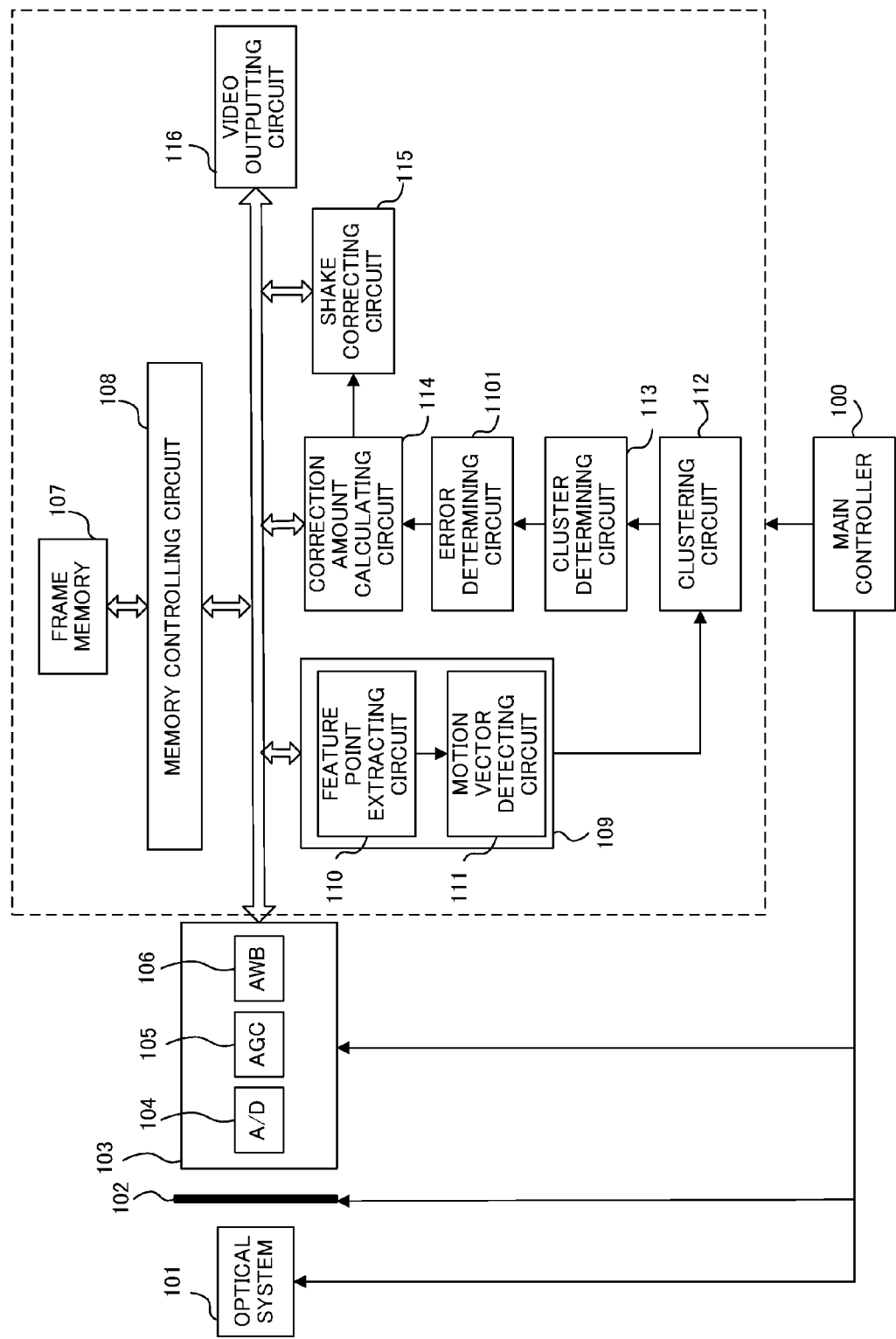
FIG. 11 shows a configuration of an image pickup apparatus which is a third embodiment (Embodiment 3) of the present invention.

FIG. 11 shows a configuration of an image pickup apparatus including an image processing apparatus which is Embodiment 3 of the present invention. Embodiment 3 determines, when there is no cluster at a position of a shake reduction target cluster estimated by a cluster determining circuit 113, whether shake reduction target cluster estimation has failed or motion vector calculation has failed, and then performs shake reduction processing.

In FIG. 11, components common to those shown in FIG. 1 are denoted by the same reference numerals as those shown in FIG. 1. The image pickup apparatus of Embodiment 3 includes, in addition to the components shown in FIG. 1, an error determining circuit 1101 which performs error processing when a cluster is not present (not detected) at the position of the shake reduction target cluster estimated by the cluster determining circuit 113. The error determining circuit 1101 serves as an estimating part together with the cluster determining circuit 113.

Hereinafter, referring to a flowchart of FIG. 12, an operation (image processing method) of the image pickup apparatus of Embodiment 3 will be described.

Steps S1201, S1202, S1203, S1204 and S1205 are respectively similar to Steps S201, S202, S203, S204 and S205 shown in FIG. 2.

At Step S1206, the error determining circuit 1101 performs, even when there is no cluster at the position of the shake reduction target cluster estimated by the cluster determining part 113, error processing such that estimation processing can be effectively performed again for subsequent frames.

Embodiment 1 estimates the position of the shake reduction target cluster in the current frame by using the information relating to the past cluster to achieve higher accuracy and higher efficiency of processing. However, in a certain frame, there may be no cluster at an estimated position. In such a case, unless a shake reduction target cluster is redetermined from the entire frame image, no shake reduction target cluster can be found for all subsequent frames.

In such a case, therefore, it is necessary to grasp a reason for no presence of a cluster at the estimated position to perform appropriate error processing such that a shake reduction target cluster can be appropriately found in the subsequent frames.

Thus, at Step S1206, when there is no cluster at the position of the cluster estimated at Step S1205, the error determining circuit 1101 estimates a position of a shake reduction target cluster in a frame image after yet another frame.

Figure 13:
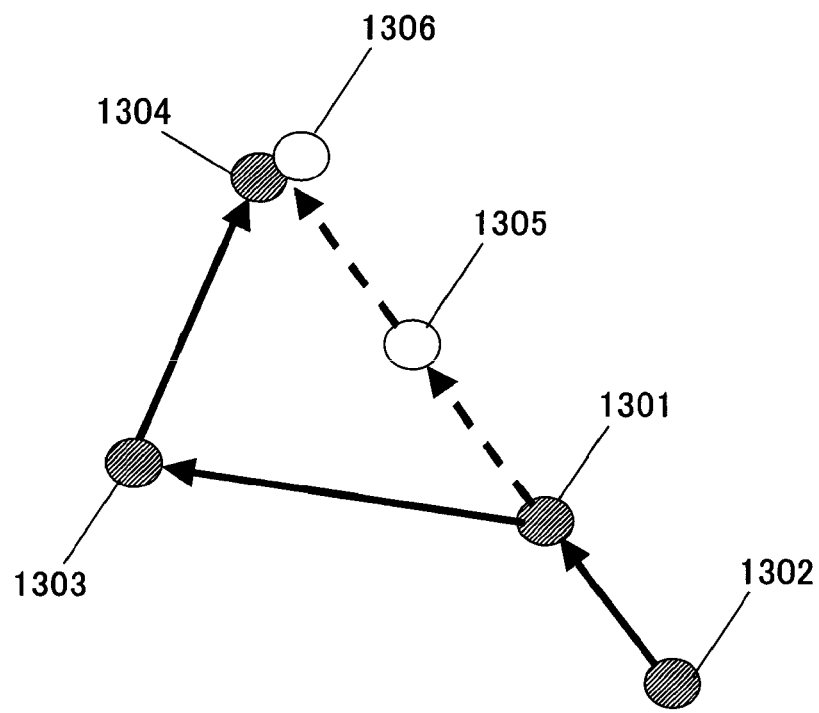
FIG. 13 shows a movement track of a cluster when motion vector detection fails.

For example, in FIG. 13, it is presumed that a position of a cluster 1305 in a current frame is estimated from positions of a cluster 1301 one frame before the current frame and a cluster 1302 two frames before the current frame. In this case, if an error occurs in motion vector calculation processing in the current frame, and a cluster including the error-calculated motion vectors moves to a position 1303, no cluster 1303 can be found even by searching around the estimated cluster 1305.

However, if a position of the cluster 1303 is set by an instantaneous motion vector calculation error due to overexposure by a flash or a system error by noise, in a next frame a cluster 1034 is formed at a position in the vicinity of an estimated cluster 1306. The cluster 1304 can accordingly be found, and may be set as a shake reduction target cluster.

Thus, Embodiment 3 estimates a position of the cluster 1306 one frame after the current frame by using estimated position information of the shake reduction target cluster 1305 in the current frame, in addition to the information relating to the shake reduction target cluster in the past frame.

If there is the cluster 1304 in the vicinity of the estimated cluster 1306, Embodiment 3 determines that the cluster 1303 has been generated due to an instantaneous error, and uses position information of the estimated cluster 1305 in the current frame for shake reduction processing. Such error processing enables, even when the shake reduction target cluster is temporarily lost due to an accidental error, good shake reduction processing can be continued.

Figure 14:
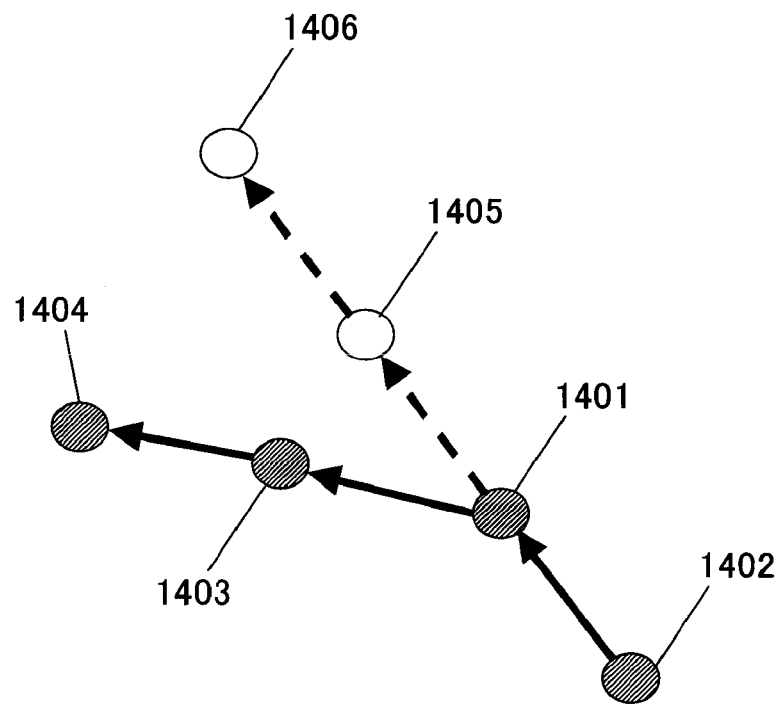
FIG. 14 shows a movement track when there is an error in estimation processing of a cluster position.

On the other hand, as shown in FIG. 14, even when a position of a cluster 1405 in the current frame is estimated by using past clusters 1401 and 1402, and a position of a cluster 1406 one frame after the current frame is estimated, there may be no cluster in the vicinity thereof. This is a case where there is an error in cluster position estimation processing in which, for example, an actual cluster moves along a track completely different from a cluster movement track drawn by the estimation processing to a position shown by reference numeral 1403 or 1404.

Method employed when determination that an error is present in the estimation processing is made include, for example, a method discarding information relating to the past cluster and then performing the estimation processing again, and a method finding a cluster again by searching around a cluster estimated position in a frame immediately before the cluster is not found. Thus, even when the estimation processing error causes estimation of the movement track completely different from that of the actual cluster, employing the estimation method different from that of Embodiment 1 enables continuance of good shake reduction processing.

In the above example, description was made of an operation example of the error determining circuit 1101 performed in the case where the instantaneous error occurs due to the flash, the system error or the like. In this case, error correction processing is performed by estimating the cluster up to one frame after the current frame. However, when other errors, for example, a shake reduction target region is covered with a shadow, or motion of the image pickup apparatus exceeding a motion vector detectable range occurs, an error generation period becomes several to several tens of frames.

In order to deal with various types of errors including such cases, the number of frames for cluster estimation is set beforehand to, for example, several tens of frames, and whether a shake reduction target cluster is found again within this range is determined. If the shake reduction target cluster is found again, it is determined that certain errors have occurred in frames in which the shake reduction target cluster has been not found, and motion vectors included in the found shake reduction target cluster may be used for calculating the shake reduction amount.

On the other hand, if the shake reduction target cluster is not found until the last of the several tens of frames, it is determined that an error has occurred in estimation processing, countermeasures are taken such as reperforming of estimation processing from a frame immediately before a frame where the shake reduction target cluster is not found. Thus, even when any types of errors occur, good shake reduction processing can be performed.

Figure 12:
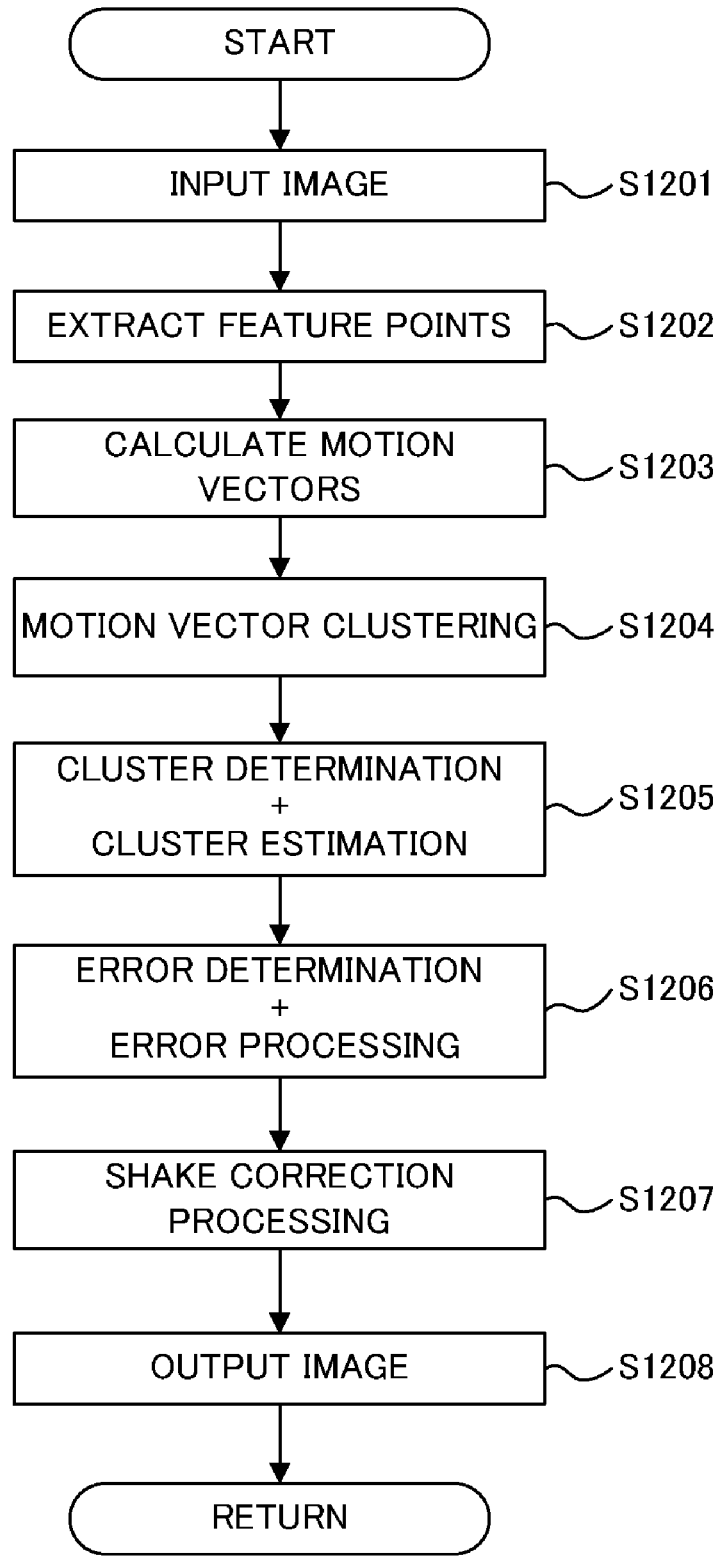
FIG. 12 is a flowchart of shake reduction processing in Embodiment 3.

In FIG. 12, Steps S1207 and S1208 are respectively similar to Steps S206 and S207 shown in FIG. 2.

As described above, Embodiment 3 continues, when a cluster corresponding to the shake reduction target cluster estimated for the current frame cannot be actually detected in the current frame, detection of the cluster corresponding to the shake reduction target cluster in a frame after the current frame by using the same or other estimation method. As a result, even when no shake reduction target cluster is found at the estimated position in the current frame due to various types of errors, a shake reduction target cluster can be found in the subsequent frame, and good shake reduction processing can be performed.

[Embodiment 4]

In each of Embodiments, the case where the image pickup apparatus incorporates the image processing apparatus has been described. However, the image processing apparatus can be separated from the image pickup apparatus.

Figure 15:
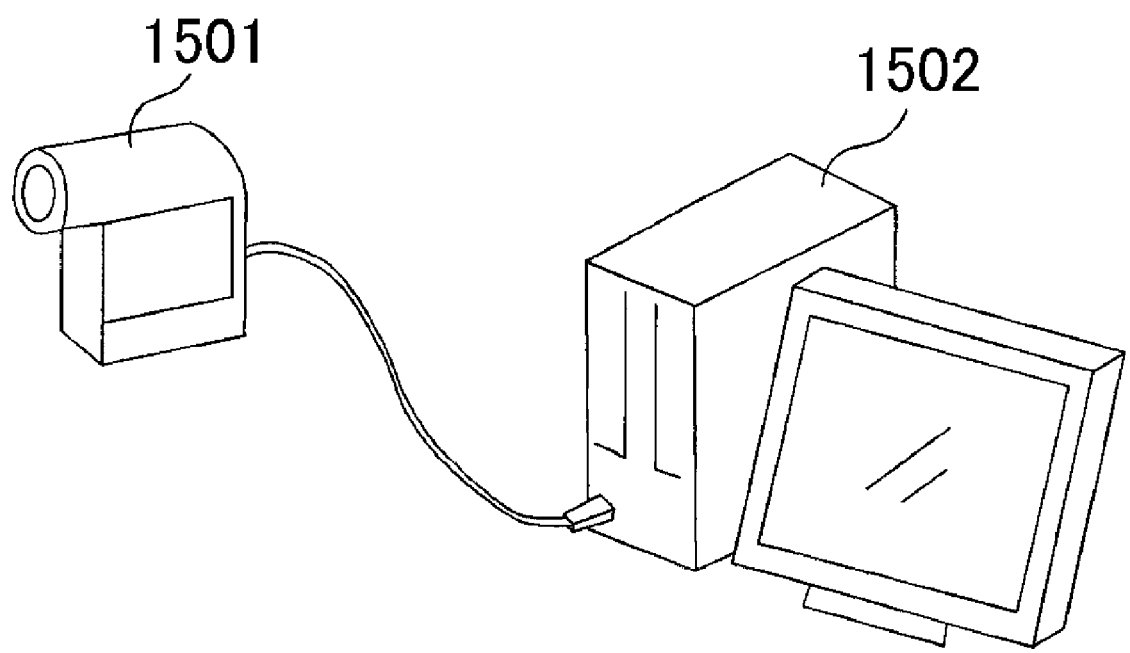
FIG. 15 shows an image processing apparatus which is a fourth embodiment (Embodiment 4) of the present invention.

For example, as shown in FIG. 15, an image pickup apparatus 1501 sequentially generates images and transmits the images to a personal computer 1502. A transmission method may be any one of a cable system and a wireless system, and the images may be transmitted via Internet or LAN.

Then, the personal computer 1502 may perform processing according to the flowcharts of FIGS. 2, 8 and 12.

In this case, the personal computer serves as the image processing apparatus.

In this case, the personal computer may detect a shake amount (motion vector), or may obtain an output from a motion vector detecting circuit provided in the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2008-290243, filed on Nov. 12, 2008, which is hereby incorporated by reference herein in its entirety.

What is claimed is:

1. An image processing apparatus comprising:
an extracting part configured to extract feature points in each of plural images sequentially generated by an image pickup apparatus;
a calculating part configured to calculate motion vectors at the feature points in each of the plural images;
a clustering part configured to perform clustering processing on the motion vectors calculated at the feature points;
a determining part configured to determine, among plural clusters obtained by the clustering processing, a specific cluster including a motion vector indicating motion of the image pickup apparatus;
an estimation detecting part configured to detect, by using an estimation method which uses information relating to the specific cluster of a first image among the plural images, the specific cluster of a second image generated after generation of the first image; and
a processing part configured to perform image stabilization processing on the second image based on the motion vector included in the specific cluster of the second image;
wherein the plural clusters obtained by the clustering processing include a cluster including the motion vector for a still object and a cluster including the motion vector for a moving object, the still and moving objects being in an image pickup area of the image pickup apparatus, and
wherein the determining part determines the cluster including the motion vector for the still object as the specific cluster.

2. An image processing apparatus according to claim 1, wherein the estimation method uses information on at least one of a position, a shape and a size of the specific cluster and a number of the motion vectors included in the specific cluster.

3. An image processing apparatus according to claim 1, wherein, when one of a cluster including the motion vectors greater in number than those included in the specific cluster and a cluster including the motion vectors in a region occupying a larger area of the image than the specific cluster exists over one of a predetermined number of images and a predetermined time period, the determining part changes the specific cluster to the one of the clusters.

4. An image processing apparatus according to claim 1, wherein the estimation detecting part continues the specific cluster detection using one of the estimation method and another estimation method in an image generated after generation of the second image when no cluster corresponding to the specific cluster of the second image has detected.

5. An image pickup apparatus comprising:
an image pickup part configured to perform image pickup of an object to sequentially generate plural images; and
an image processing apparatus,
wherein the image processing apparatus comprising:
an extracting part configured to extract feature points in each of plural images sequentially generated by an image pickup apparatus;
a calculating part configured to calculate motion vectors at the feature points in each of the plural images;
a clustering part configured to perform clustering processing on the motion vectors calculated at the feature points;
a determining part configured to determine, among plural clusters obtained by the clustering processing, a specific cluster including a motion vector indicating motion of the image pickup apparatus;
an estimation detecting part configured to detect, by using an estimation method which uses information relating to the specific cluster of a first image among the plural images, the specific cluster of a second image generated after generation of the first image; and
a processing part configured to perform image stabilization processing on the second image based on the motion vector included in the specific cluster of the second image;

wherein the plural clusters obtained by the clustering processing include a cluster including the motion vector for a still object and a cluster including the motion vector for a moving object, the still and moving objects being in an image pickup area of the image pickup apparatus, and wherein the determining part determines the cluster including the motion vector for the still object as the specific cluster.

6. An image processing method comprising the steps of:

extracting feature points in each of plural images sequentially generated by an image pickup apparatus;

calculating motion vectors at the feature points in each of the plural images;

performing clustering processing on the motion vectors calculated at the feature points;

determining, among plural clusters obtained by the clustering processing, a specific cluster including a motion vector indicating motion of the image pickup apparatus;

detecting, by using an estimation method which uses information relating to the specific cluster of a first image among the plural images, the specific cluster of a second image generated after generation of the first image; and performing image stabilization processing on the second image based on the motion vector included in the specific cluster of the second image;

wherein the plural clusters obtained by the clustering processing include a cluster including the motion vector for a still object and a cluster including the motion vector for a moving object, the still and moving objects being in an image pickup area of the image pickup apparatus, and wherein the determining part determines the cluster including the motion vector for the still object as the specific cluster.

* * * * *